(12) United States Patent
Ishii

(10) Patent No.: US 9,774,836 B2
(45) Date of Patent: Sep. 26, 2017

(54) IMAGE PROJECTOR THAT CORRECTS SHIFT DIRECTION BASED ON DEFORMATION

(71) Applicant: CANON KABUSHIKI KAISHA, Tokyo (JP)

(72) Inventor: Atsushi Ishii, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/008,869

(22) Filed: Jan. 28, 2016

(65) Prior Publication Data
US 2016/0227180 A1    Aug. 4, 2016

(30) Foreign Application Priority Data
Jan. 30, 2015   (JP) ................. 2015-016172

(51) Int. Cl.
*H04N 9/31*   (2006.01)
*G03B 21/14*   (2006.01)
*G03B 21/26*   (2006.01)

(52) U.S. Cl.
CPC ......... *H04N 9/3185* (2013.01); *G03B 21/142* (2013.01); *G03B 21/147* (2013.01); *G03B 21/26* (2013.01)

(58) Field of Classification Search
CPC .... G03B 21/147; G03B 21/005; G03B 27/68; H04N 9/3147; H04N 9/3182; H04N 9/3185; H04N 9/3194
See application file for complete search history.

(56) References Cited

U.S. PATENT DOCUMENTS

| | | | | |
|---|---|---|---|---|
| 9,344,695 B2 * | 5/2016 | Shibata | ................ | H04N 9/3185 |
| 2012/0218528 A1 * | 8/2012 | Kano | ................... | G03B 21/142 |
| | | | | 353/101 |
| 2013/0083298 A1 * | 4/2013 | Yoshimura | ........... | G03B 21/006 |
| | | | | 353/69 |
| 2013/0107228 A1 * | 5/2013 | Tsuji | .................... | G03B 21/145 |
| | | | | 353/70 |
| 2013/0169888 A1 * | 7/2013 | Tannhauser | .......... | H04N 9/3188 |
| | | | | 348/745 |
| 2014/0111536 A1 * | 4/2014 | Shinozaki | ................ | G09G 5/37 |
| | | | | 345/589 |

FOREIGN PATENT DOCUMENTS

JP           2003195416 A           7/2003

\* cited by examiner

*Primary Examiner* — Sultan Chowdhury
(74) *Attorney, Agent, or Firm* — Rossi, Kimms & McDowell LLP

(57) ABSTRACT

An image projector includes an image forming element that is illuminated by a light from a light source, a projection optical system that projects a light output from the image forming element, a shifter that shifts the projection optical system with respect to the image forming element so as to shift a projection position, a deforming part that deforms an image formed on the image forming element, and a corrector that corrects a shift direction with the shifter on the basis of a deformation state by the deforming part.

7 Claims, 4 Drawing Sheets

IMAGE PROJECTOR THAT CORRECTS SHIFT DIRECTION BASED ON DEFORMATION

BACKGROUND OF THE INVENTION

Field of the Invention

The present invention relates to an image projector.

Description of the Related Art

An image projector projects a light modulated by a light modulation element (image forming element) such as a liquid crystal panel onto a projection surface such as a screen using a projection optical system so as to display a projection image.

Adjusting projection conditions, such as an orientation and a tilt of the image projector, and a projection optical system to vary a projection size and a projection position enable a user to display a projection image on a desired region in a projection surface.

However, adjusting the projection conditions may cause geometric distortions (for example, trapezoidal distortions) in the projection image.

Japanese Patent Laid-Open No. ("JP") 2003-195416 discloses a projection type display apparatus that corrects image distortion according to a lens shift quantity to control screen distortion generated by a tilt projection.

A method of JP 2003-195416 can continue to correct image distortion even accurately if a lens shift is performed while correcting screen distortion generated by a tilt projection.

However, the method of JP 2003-195416 fails to consider a direction where a projection image on a projection surface shifts, and thus the projection image shifts in a direction different from a direction intended by a user.

SUMMARY OF THE INVENTION

In view of the foregoing, the present invention provides an image projector capable of shifting a projection image formed on a projection surface with a natural operation for a user.

An image projector as one aspect of the present invention includes an image forming element that is illuminated by a light from a light source, a projection optical system that projects a light output from the image forming element, a shifter that shifts the projection optical system with respect to the image forming element so as to shift a projection position, a deforming part that deforms an image formed on the image forming element, and a corrector that corrects a shift direction with the shifter on the basis of a deformation state by the deforming part.

Further features of the present invention will become apparent from the following description of exemplary embodiments (with reference to the attached drawings).

DESCRIPTION OF THE EMBODIMENTS

Figure 1:
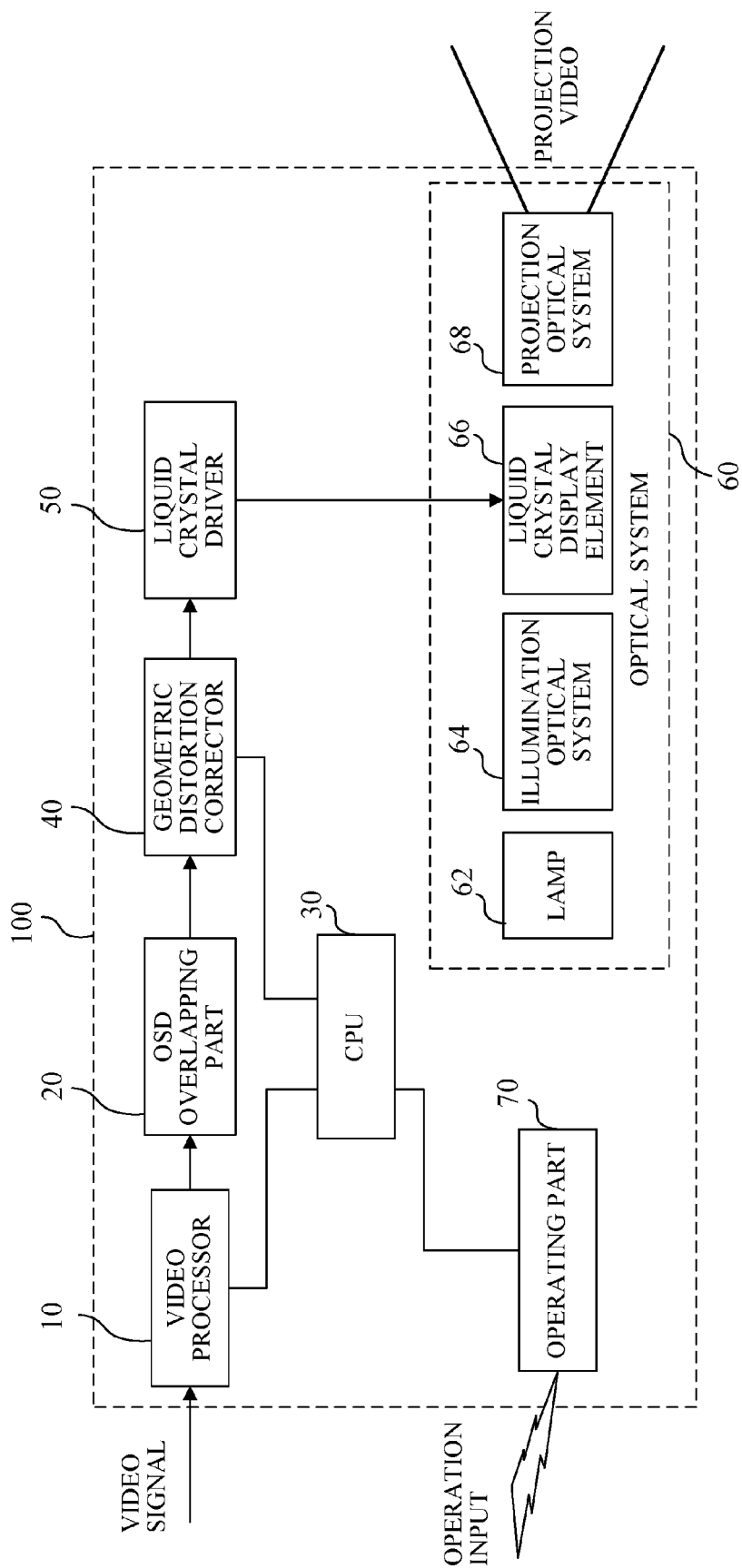
FIG. 1 is a block diagram illustrating a configuration of a projector according to an embodiment of the present invention.

A liquid crystal projector 100 according to an embodiment of the present invention, which displays an input image signal using a liquid crystal display element, will be explained referring to FIG. 1.

An video processor 10 is provided with terminals, such as a composite terminal and an HDMI terminal, to input a video signal and a receiver IC to receive the video signal input through the terminal. The video processor 10 generates a video signal performed image processing, such as a brightness correction, a contrast correction, a gamma conversion, a color conversion, a resolution conversion, sharpening processing and an IP conversion, with respect to the input video signal.

An OSD overlapping part (image overlapping part) 20 overlaps an OSD image with respect to the video signal output from the video processor 10. The OSD image can be generated on the basis of not only an image data, such as a bitmap, preliminarily prepared but also a line, a rectangle, or drawing instructions each pixel unit.

A geometric distortion corrector 40 performs deformation processing to correct geometric distortion on a projection image with respect to the video signal output from the OSD overlapping part 20. Performing appropriate processing using the geometric distortion corrector 40 can control distortion of a projection image generated by a tilt projection A liquid crystal driver 50, which is connected to the geometric distortion corrector 40, converts the image signal corrected by the geometric distortion corrector 40 to a liquid crystal driving signal and drives a liquid crystal display element 66 of an optical system 60.

The optical system 60 includes a lamp 62, an illumination optical system 64, the liquid crystal display element 66, and a projection optical system 68. A light output from the lamp 62 passes the illumination optical system 64 and is projected onto a screen as a projection image through the projection optical system (projection lens) 68 after being modulated by the liquid crystal display element 66. The liquid crystal display element 66, which is connected to the liquid crystal driver 50, modulates an incident luminous flux on the basis of the liquid crystal driving signal output from the liquid crystal driver 50. Moreover, the projection optical system 68 drives a lens and a unit using a motor to perform optical zooming (magnification and reduction of the projection image) and an optical shift (movement of a projection position).

An operating part 70 includes a button where a user inputs an operation and an infrared light receiver to receive infrared light from a remote controller, and converts the input operation to an electric signal. The operations includes at least one of determination, cancellation, a menu call for performing various setting, vertical and horizontal direction instructions, and power control.

A CPU 30 is connected to the video processor 10, the OSD overlapping part 20, the geometric distortion corrector 40, the operating part 70, and the projection optical system 68. The CPU 30 is a microcomputer (processor) to control a power source and a state of each part of the liquid crystal projector 100. Moreover, the CPU 30 receives the operation, which the user inputs, from the operating part 70 and performs controls according to the operation. For example, the CPU 30 controls the OSD overlapping part 20 to display a menu screen, performs controls of the video processor 10, the geometric distortion corrector 40, and the projection optical system 68, controls the state and the function of the each part, and acquire the state. Further, the CPU 30 corrects a shift direction to a preferable direction for the user with respect to shift instructions of the projection image received from the operating part 70 and sets the corrected shift direction to the projection optical system 68.

Figure 2:
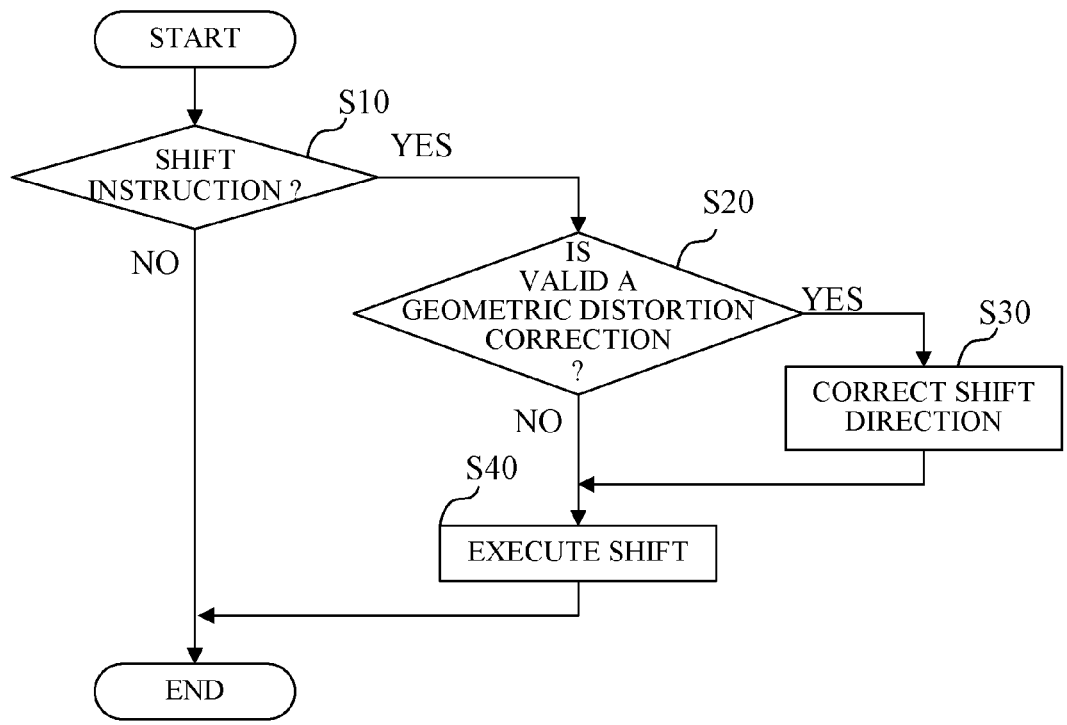
FIG. 2 is a flowchart according to the embodiment of the present invention.

FIG. 2 is a flowchart, which is controlled by the CPU 30, to explain a shift operation of the projection image by the projection optical system 68. This processing is executed according to a computer program (control program) by the CPU30. The flow illustrated in FIG. 2 starts at every constant time (for example, 1 millisecond).

When the processing starts, at step S10, the CPU 30 determines whether or not shift operation information of the projection image (including directions and shift quantities) is input into the operating part 70. If the operation is input, the flow proceeds to step S20. Otherwise, this flow ends. At step S20, the CPU30 acquires a current correction setting from the geometric distortion corrector 40. If the correction is valid, the flow proceeds to step S30. Otherwise, the flow proceeds to step S40. At step S30, the CPU 30 corrects the shift operation information input from the operating part 70.

At step S40, the CPU 30 performs a optical shift setting (such as control of a motor) with respect to the projection optical system 68. The setting at this step is performed on the basis of the shift operation information. If the geometric distortion correction is valid, the setting is performed on the basis of the shift operation information corrected at the step S30. After completing the optical shift setting with respect to the projection optical system 68, the flow ends.

Figure 3:
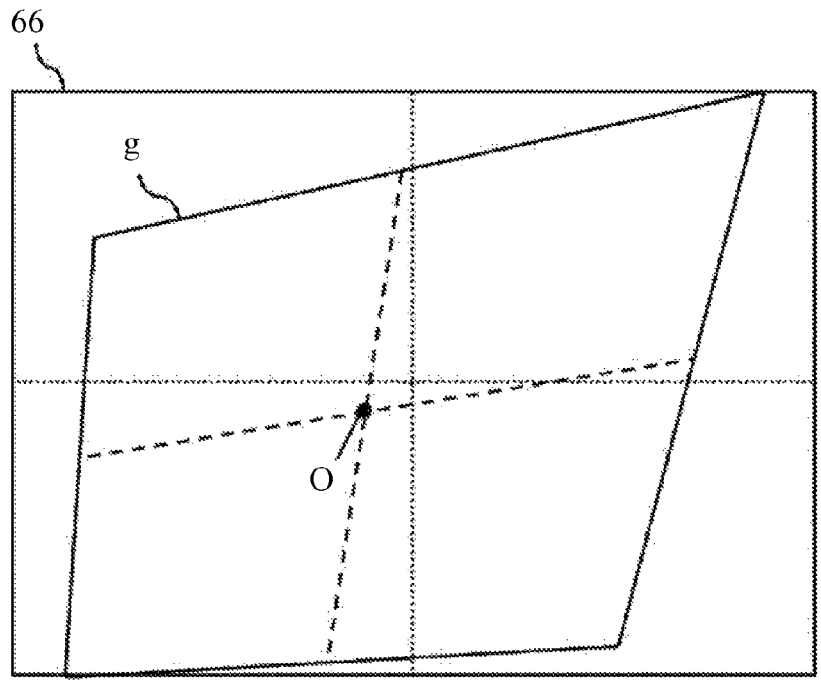
FIG. 3 is a schematic diagram of an image drawn by a liquid crystal display element 66.

Hereinafter, the correction performed at the step S30 will be explained referring to FIGS. 3 to 6. FIG. 3 is a schematic diagram of the image formed on the liquid crystal display element 66, g of FIG. 3 represents a region where the image is formed after the geometric distortion correction, and the point o of FIG. 3 represents a center position of the image after the geometric distortion correction. Moreover, the dotted lines of FIG. 3 represent center lines in horizontal and vertical directions of the liquid crystal display element 66, and the dashed lines of FIG. 3 represent center lines of the image after the geometric distortion correction. If the geometric distortion correction is not performed, the dotted lines and the dashed lines coincide with each other.

Figure 4:
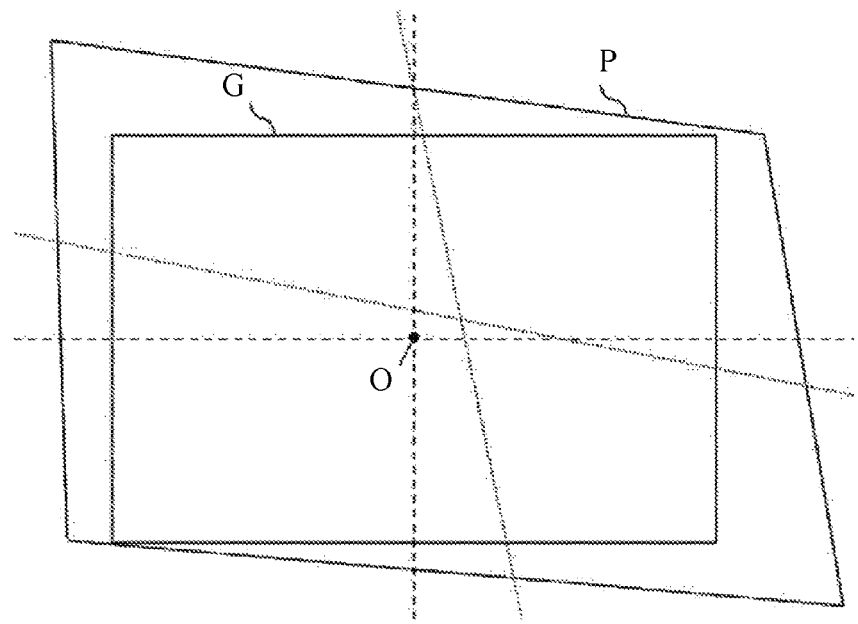
FIG. 4 is a schematic diagram of a projection image formed on a projection surface.

FIG. 4, which corresponds to FIG. 3, is a schematic diagram of the projection image formed on the projection surface when projecting the image of FIG. 3. G of FIG. 4 represents a region on the projection surface corresponding to g of FIG. 3, the point O of FIG. 4 represents a point on the projection surface corresponding to the point o of FIG. 3, and the dotted lines and dashed lines respectively represent lines on the projection surface formed by the extensions of the dotted lines and dashed lines in FIG. 3. P represents a region on the projection surface corresponding to a region in which the liquid crystal display element 66 can draw the image, the projection image is formed on the region P when not performing the geometric distortion correction, and the projection image is formed on the region G when performing the geometric distortion correction.

Figure 6:
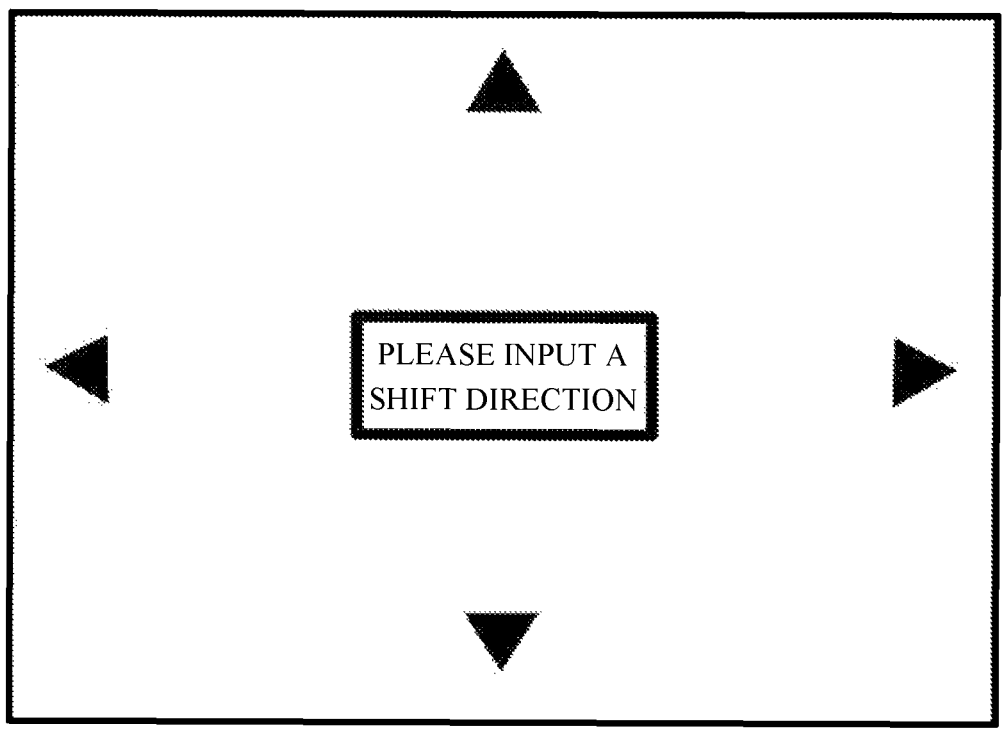
FIG. 6 is a schematic diagram of a GUI picture for a shift operation.

FIG. 6 is a schematic diagram of a GUI picture displayed so that a user input a shift operation. When receiving the shift operation of the user, the projector generally display the image overlapped with OSD image configuring the GUI picture as illustrated in FIG. 6 by the OSD overlapping part 20. when receiving the operation input being a pressing of a button such as a cross button of the remote controller while displaying the image, the operating part 70 determines that the shift operation is input and performs the optical shift setting relative to the projection optical system 68. The optical shift for the operator means that the liquid crystal display element 66 moves in a direction corresponding to the operation, and the center of the liquid crystal display element 66 moves in the direction corresponding to the operation along the dotted lines of FIGS. 3 and 4.

When the geometric distortion correction is not performed, the directions indicated in the OSD image (directions illustrated by triangles in FIG. 6) coincides with the direction of the dotted line, and the projection image shifts in the direction indicated in the OSD image. However, when the geometric deformation is performed, the geometric distortion correction is applied to the OSD image. As a result, the directions indicated in the OSD image are the dashed lines of FIGS. 3 and 4, and the projection image fails to shift in the direction indicated in the OSD image.

Figure 5:
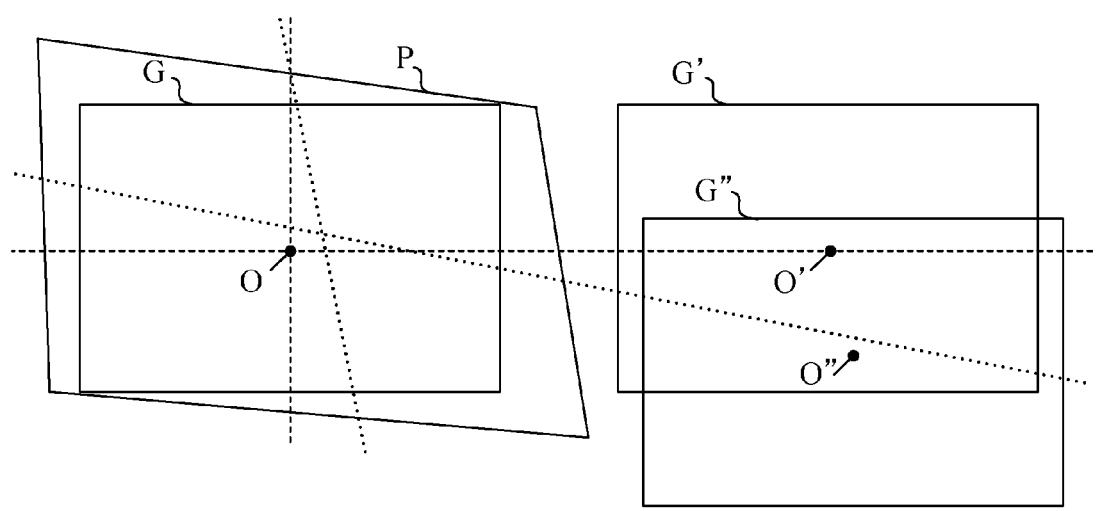
FIG. 5 is a comparison diagram between a position of a projection image after shifting and that of a conventional example.

FIG. 5 is a schematic diagram illustrating differences of behaviors between a conventional example and the embodiment when the optical shift in the right direction of FIG. 4 is performed with respect to the state of FIG. 4. P, G, O, the dotted lines and the dashed lines of FIG. 5 are equivalent to that of FIG. 4, G' and G" represent a region of G after shifting, and O' and O" represent positions of O after shifting. Performing the shifts deforms geometric distortion shapes, but, in FIG. 5, an exemplification continuing to calculate so that geometric distortion correction becomes appropriate according to the shifts is illustrated, and correction control is automatically performed on the basis of the center points O, O', and O" of the projection image to keep rectangular shape.

When the shift direction is not corrected at the step S30 as the conventional example, the projection image shifts along the direction of the dotted lines as described above and G moves to G" after shifting. This means that the projection image shifts in the direction of the dotted lines though the operator intends to shift the projection image in the direction indicated in the OSD image, and the operation intended by the operator differs from the actual operation in the conventional example.

Meanwhile, in the embodiment, performing the correction at step S30 enables the shift direction to correct so as not to deviate the position of the point O from the dashed line after shifting, and thus G moves to G' after shifting. In FIG. 5, correction adding shifts in the upper direction to shifts in the right direction so as to move the position O" on the dashed lines (the position O') is performed.

Thus, the point O moves to the position O', and the intended shifts that the operator can observe shifts of the projection image in the direction indicated in the OSD image are performable.

In the embodiment, performing the shifts based on the operation input with respect to the operating part 70 is explained. However, conditions to perform the shifts may be other conditions, and a correction with respect to a preliminarily programmed shift operation may be performed. Moreover, in the embodiment, the optical shift by the projection optical system 68 is explained. However, the shifts may be performed by other means, such as movement of the liquid crystal display element 66, movement of a drawing position in the video of the liquid crystal display element 66 by the liquid crystal driver 50, and combination thereof. Additionally, in the embodiment, deforming shapes to correct trapezoidal distortions generated by the tilt projection is explained. However, deformation of a shape may be otherwise, such as deformation of a shape to correct a curved surface projection, deformation of a shape when being projected onto a plurality of planes, and free deformation to an arbitrary shape. Further, when a plurality of planes are used, the configuration that a shift direction is corrected on the basis of a surface onto which specific points on the projection image (for example, a center of the image) is projected may be applied.

Furthermore, in the embodiment, the correction of the shifts adding settings is explained. However, the correction may be realized by separately performing correction shifts after stopping non-correction shifts or alternately performing correction shifts and non-correction shifts. Besides, the present invention is achieved by performing the following processing. In other words, the processing is supplying a software (program) to realize a function of the embodiment to a system or a apparatus through a network or various storage medium and reading out the program by a computer (or a CPU or a MPU) of the system or the apparatus to execute it.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-016172, filed on Jan. 30, 2015 which is hereby incorporated by reference herein in its entirety.

What is claimed is:

1. An image projector comprising:
   an image forming element that is illuminated by a light from a light source;
   a projection optical system that projects a light output from the image forming element as a projection image;
   a shifter that shifts the projection optical system with respect to the image forming element along a shift direction;
   a deforming part that deforms an image formed on the image forming element; and
   a corrector that corrects the shift direction on the basis of a deformation state by the deforming part,
   wherein the shifter shifts the projection optical system along the corrected shift direction to shift the projection image along a predetermined direction.

2. The image projector according to claim 1, wherein the deforming part corrects a geometric distortion of the projection image projected onto a projection surface.

3. The image projector according to claim 1, wherein the corrector corrects the shift direction to a direction different from a direction orthogonal to or parallel to a direction before a correction.

4. The image projector according to claim 1, further comprising:
   an image overlapping part that overlaps the image with an image illustrating vertical and horizontal directions; and
   an operating part that receives operation input instructions regarding vertical or horizontal directions,
   wherein the corrector corrects the shift direction so that a direction in which the image is overlapped by the overlapping part coincides with a direction associated with the operation input instructions received by the operating part.

5. The image projector according to claim 1, further comprising:
   an image shifter that shifts a forming region of the image formed on the image forming element,
   wherein the corrector corrects the shift direction by the image shifter on the basis of the deformation state by the deforming part.

6. An image projecting method comprising the steps of:
   illuminating an image forming element by a light from a light source;
   projecting a light output from the image forming element as a projection image using a projection optical system;
   shifting the projection optical system with respect to the image forming element along a shift direction;
   deforming an image formed on the image forming element; and
   correcting the shift direction on the basis of a deformation state corresponding to the deforming of the image,
   wherein the projection optical system is shifted along the corrected shift direction to shift the projection image along a predetermined direction.

7. A non-transitory computer-readable medium configured to store an image projecting method, the method comprising the steps:
   illuminating an image forming element by a light from a light source;
   projecting a light output from the image forming element as a projection image using a projection optical system;
   shifting the projection optical system with respect to the image forming element along a shift direction;
   deforming an image formed on the image forming element; and
   correcting the shift direction on the basis of a deformation state corresponding to the deforming of the image, wherein the projection optical system is shifted along the corrected shift direction to shift the projection image along a predetermined direction.

* * * * *